July 28, 1942.   M. KATCHER   2,291,161

BALL BEARING KNUCKLE JOINT

Filed Nov. 16, 1940

INVENTOR
*Morris Katcher*
BY
*Emanuel Scheyer*
ATTORNEY

Patented July 28, 1942

2,291,161

UNITED STATES PATENT OFFICE 2,291,161

BALL BEARING KNUCKLE JOINT

Morris Katcher, New York, N. Y.

Application November 16, 1940, Serial No. 365,857

13 Claims. (Cl. 287—90)

This invention relates to a ball bearing knuckle joint providing limited universality of movement and is particularly adapted for use in the tie rod and drag link connections for the steering mechanism of automotive vehicles.

It is an object of this invention to provide a joint which is automatically self-adjusting to compensate for wear of the engaging parts and in which the parts are so shaped and frictionally held to each other that lost motion and rattling is effectively prevented. Spring means are used between the engaging parts to cause one to press on the other. A plurality of steel balls is used to transmit the spring pressure between the parts, the stud being one of the parts in the case of a steering knuckle joint. The balls are arranged in a ring. They are so held on one of the engaging parts that as one of said parts tilts with respect to the other, the ring of balls is caused to tilt accordingly. In one form, the ring of balls is caused to tilt with the head of the stud. In another form, the head of the stud is caused to tilt with respect to the ring of balls because of the socket cap which is spring held in the housing.

The invention is illustrated by showing it applied to a steering knuckle joint.

Other objects and advantages will become apparent upon further study of the description and drawing, in which.

Figure 2:
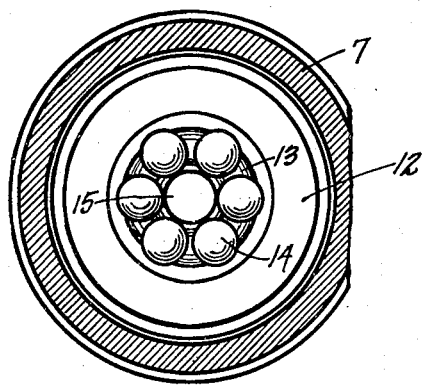
Fig. 2 is a sectional plan taken along the line 2—2 of Fig. 1 with the socket cap omitted.
Figure 1:
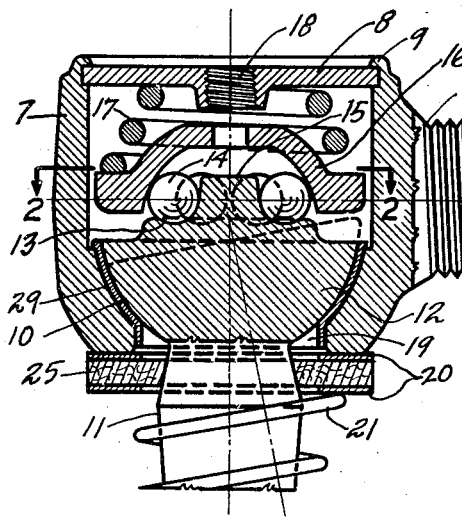
Fig. 1 is a section through one form of the joint, a portion of the threaded shank of the housing being broken away and a part only of the stud being shown.

Threaded shank 6, Figs. 1 and 2, is provided with a hollow boss or housing 7 at its end. The upper end of housing 7 is closed by means of a circular plate 8 set in a groove near said end, the upper edges of the housing being peened over at 9 to retain said plate. The lower end of housing 7 on the inside is concaved to present a surface 29 in the form of a spherical zone. Nesting in said lower end is a bushing 10 whose inner and outer surfaces are also in the form of spherical zones. Said bushing is made of antifriction metal such as phosphor-bronze. Stud 11 is provided with a head 12 whose side surface is in the form of a spherical zone slidably fitting inside of bushing 10. The top of head 12 is provided with a ball groove or raceway 13 in which is located a ring of steel balls 14. A nose 15 is provided on head 12, said nose forming a core about which the balls 15 rotate, the side of said core acting to extend the raceway 13 upwards. Above balls 14 is a cupped or socket cap 16 which is urged down upon the balls by spring 17, the upper end of said spring reacting against the under side of plate 8. A threaded hole 18 is provided in plate 8 for the introduction of lubricant, said hole being adapted to have a lubricating fitting, not shown, screwed into it. Stud 11 projects from housing 7 through an aperture 19. To prevent the lubricant from escaping from the housing, a washer unit is provided on stud 11, comprising two outer steel washers 20 with felt washer 25 between them. A spring 21 reacts against the washer.

As stud 11 swings relatively to housing 7, a particular example being shown by the dash lines of Fig. 1, the ring of balls 14 swings with it, the balls rolling up one side of the inside or recess of cap 14 and down the other, said cap remaining substantially without any swinging with respect to the housing because the spherical surface of the inside of cap 14 has its center normally at the same center as that of the spherical surface of the side of head 12. It can thus be seen that the ring of balls swings, at any time, about an axis passing through said latter center.

Figure 4:
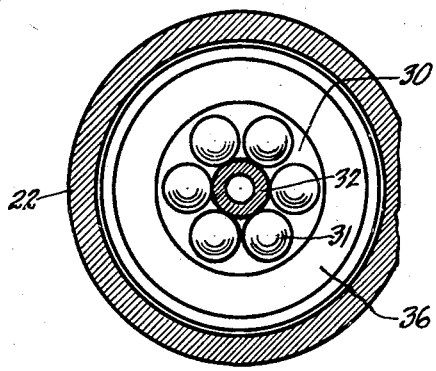
Fig. 4 is a sectional plan taken substantially along the line 4—4 of Fig. 3.
Figure 3:
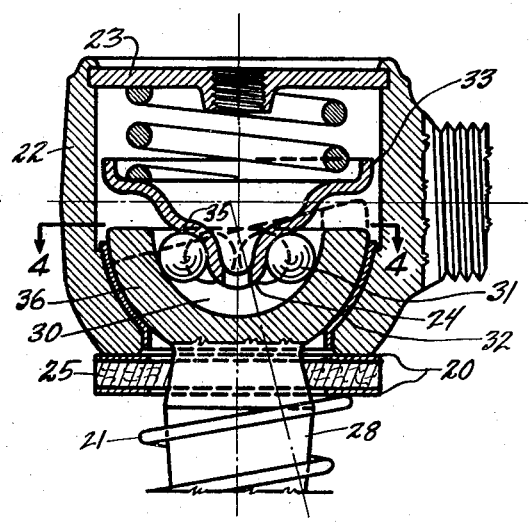
Fig. 3 is a section through another form of the joint, also with a portion of the threaded shank of the housing broken away and a part only of the stud being shown.

In the modification shown in Figs. 3 and 4, housing 22 with its closing plate 23, bushing 24 and washers 20 and 25 are the same as described for Fig. 1. Stud 28 is provided with a head 36 whose side surface is in the form of a spherical zone slidably fitting inside of bushing 24. The top of head 36 is provided with a spherical recess 30, the surface of which is concentric with the spherical side surface of head 36. Balls 31 are set in recess 30 in the form of a ring, the ring form being maintained by nose 32 of cap 33 which is pressed down between the balls by spring 34. Cap 33 is curved inward to form with nose 32 a raceway 35 for balls 31.

As stud 28 swings relatively to housing 22, a particular example being shown by the dash lines of Fig. 3, the ring of balls 31 rides up and down on the side of recess 30, said ring not swinging relatively to the housing. Cap 33 also remains substantially without any swinging with respect to the housing, when stud 28 has such swinging, because the spherical surface of recess 30 has the same center as that of the spherical side of head 36. It can thus be seen that the ring of balls swings at any time relatively about an axis passing through said latter center just as it does in the form of the joint shown in Fig. 1.

It is to be noted in Fig. 1, that as head 12 swings with respect to housing 7, the ring of balls swings with it, that is said head holds the balls at a fixed distance from its longitudinal axis. So in Fig. 3, as head 36 swings with respect to housing 22, the ring of balls remains with cap 33, that is said cap holds the balls at fixed distance from its longitudinal axis.

I claim:

1. A joint comprising a housing having an aperture, a headed stud extending through the aperture with the head of the stud slidably mounted in the housing for limited universal motion, a cap in the housing, a plurality of balls held between the cap and the end of the head away from the aperture, and spring means urging the cap against the balls, the end of the head away from the aperture having a raceway formed therein in which the balls roll clear of the housing, the pressure of the cap against the balls maintaining them in the raceway, said cap being so formed to contact the balls in a manner to permit universal motion of itself with respect to the head.

2. A joint comprising a housing having an aperture, a headed stud extending through the aperture with the head of the stud slidably mounted in the housing for limited universal motion, a cap in the housing, a plurality of balls set between the cap and the end of the head away from the aperture, and spring means urging the cap against the balls, said end of the head being recessed to hold the balls clear of the housing, the pressure of the cap against the balls maintaining them in the head.

3. A joint comprising a housing having an aperture and an inner bearing surface near said aperture, a stud having a head member, said stud extending through the aperture, the side surface of the head member being of substantially spherical formation slidably engaging the bearing surface near the aperture for limited universal motion of the stud with respect to the housing, a cap member in the housing, a plurality of balls held between the cap member and the end of the head member away from the aperture, one of said members being recessed to hold the balls at a fixed distance from its longitudinal axis, the other of said members having a recess formed therein with a substantially spherical surface over which the balls may roll, the center of the spheres of which said surfaces are a part being substantially coincident, and spring means urging the cap member against the balls.

4. A joint comprising a housing having an aperture and an inner bearing surface near said aperture, a stud having a head, said stud extending through the aperture, the side surface of the head being of substantially spherical formation slidably engaging the bearing surface near the aperture for limited universal motion of the stud with respect to the housing, a cap in the housing, a plurality of balls held between the cap and the end of the head away from the aperture, the cap being recessed to hold the balls at a fixed distance from its longitudinal axis, the head at said end having a recess formed therein with a substantially spherical surface over which the balls may roll, said spherical surfaces being substantially concentric, and spring means urging the cap against the balls.

5. A joint comprising a housing having an aperture and an inner bearing surface near said aperture, a stud having a head, said stud extending through the aperture, the side surface of the head being of substantially spherical formation slidably engaging the bearing surface near the aperture for limited universal motion of the stud with respect to the housing, a cap in the housing, a plurality of balls held between the cap and the end of the head away from the aperture, said head being recessed at said end to hold the balls at a fixed distance from its longitudinal axis, the cap having a recess formed therein with a substantially spherical surface over which the balls may roll, the center of the spheres of which said surfaces are a part being substantially coincident, and spring means urging the cap against the balls.

6. A joint comprising a housing having an aperture, a headed stud extending through the aperture with the head of the stud slidably mounted in the housing for limited universal motion, a cap in the housing, a plurality of balls held in the form of a ring between the cap and the end of the head away from the aperture, and spring means urging the cap against the balls, the end of the head away from the aperture having a raceway formed therein in which the balls roll, said end having an abruptly extending nose projecting a substantial distance into the ring of balls, a part of the raceway being on the side of said nose, the pressure of the cap against the balls maintaining them in the raceway.

7. A joint comprising a housing having an aperture, a headed stud extending through the aperture with the head of the stud slidably mounted in the housing for limited universal motion, a cap in the housing, a plurality of balls held in the form of a ring between the cap and the end of the head away from the aperture, and spring means urging the cap against the balls, said cap having a raceway formed therein in which the balls roll, said cap being formed with an abruptly extending nose projecting a substantial distance into the ring of balls, a part of the raceway being on the side of said nose, the pressure of the cap against the balls maintaining them in the raceway.

8. A joint comprising a housing having an aperture and an inner bearing surface near said aperture, a stud having a head member, said stud extending through the aperture, the side surface of the head member being of substantially spherical formation slidably engaging the bearing surface near the aperture for limited universal swinging motion of the stud with respect to the housing, a cap member in the housing, a plurality of balls held in a ring between the cap member and the end of the head member away from the aperture, and spring means urging the cap member against the balls, said ring of balls swinging with one of said members at any time relatively to the other about an axis passing through the longitudinal axis of the other member substantially at the center of the sphere of which said spherical surface is a part.

9. A joint comprising a housing having an aperture, a headed stud extending through the aperture with the head member of the stud slidably mounted in the housing for limited universal motion, a cap member in the housing, a plurality of balls held in the form of a ring between the cap member and the end of the head member away from the aperture, and spring means urging the cap member against the balls, the end of one of said members having an abruptly extending nose projecting a substantial distance into the ring of balls maintaining the latter against radially inward motion.

10. A joint comprising a housing having an aperture, a stud having a head member, said stud extending through the aperture with the head member of the stud slidably mounted in the housing for limited universal motion, a cap member in the housing, a plurality of balls set between the cap member and the end of the head member away from the aperture, and spring means urging the cap member against the balls, one of said members being recessed to form a raceway for the balls, said end of the head member and the cap member cooperating to hold the balls in the raceway and therefore in a ring of substantially fixed diameter, the recessed member having a portion projecting into the ring of balls, but stopping short enough of the other member to permit relative universal motion of one member with respect to the other.

11. A joint comprising a housing having an aperture, a stud having a head member, said stud extending through the aperture with the head member slidably mounted in the housing for limited universal motion, a cap member in the housing, a plurality of balls held between the cap member and the end of the head member away from the aperture, and spring means urging the cap member against the balls, one of said members being recessed to form a raceway for the balls, said end of the head member and the cap member cooperating to hold the balls in the raceway and therefore in a ring of substantially fixed diameter, the recessed member having a portion projecting into the ring of balls and the other member, but stopping short enough thereof to permit universal motion of one member with respect to the other, the member without the raceway being hollowed out to receive the balls and said projecting portion to permit said motion.

12. A joint comprising a housing having an aperture, a headed stud extending through the aperture with the head of the stud slidably mounted in the housing for limited universal motion, a cap in the housing, a plurality of balls held between the cap and the end of the head away from the aperture, and spring means urging the cap against the balls, the cap being recessed to form a raceway for the balls, said end of the head and the cap cooperating to hold the balls in the raceway and therefore in a ring of substantially fixed diameter, the cap having a portion projecting into the ring of balls and the head, but stopping short enough thereof to permit universal motion of the cap with respect to the head, the head being hollowed out to receive the balls and said projecting portion to permit said motion.

13. A joint comprising a housing having an aperture, a headed stud extending through the aperture with the head of the stud slidably mounted in the housing for limited universal motion, a cap in the housing, a plurality of balls held between the cap and the end of the head away from the aperture, and spring means urging the cap against the balls, the head of said end being recessed to form a raceway for the balls, the pressure of the cap against the balls holding them in the raceway, maintaining the ring of balls as a whole in substantially fixed relation to the head, the head having a portion projecting into the ring of balls and the cap but stopping short enough thereof to permit universal motion of the cap with respect to the head, the cap being dished to receive the balls and said projecting portion to permit said motion.

MORRIS KATCHER.